Aug. 8, 1950     H. J. ZIMMERMANN     2,517,955
CENTRIFUGAL MERCURY CLUTCH
Filed Nov. 11, 1944     3 Sheets-Sheet 1
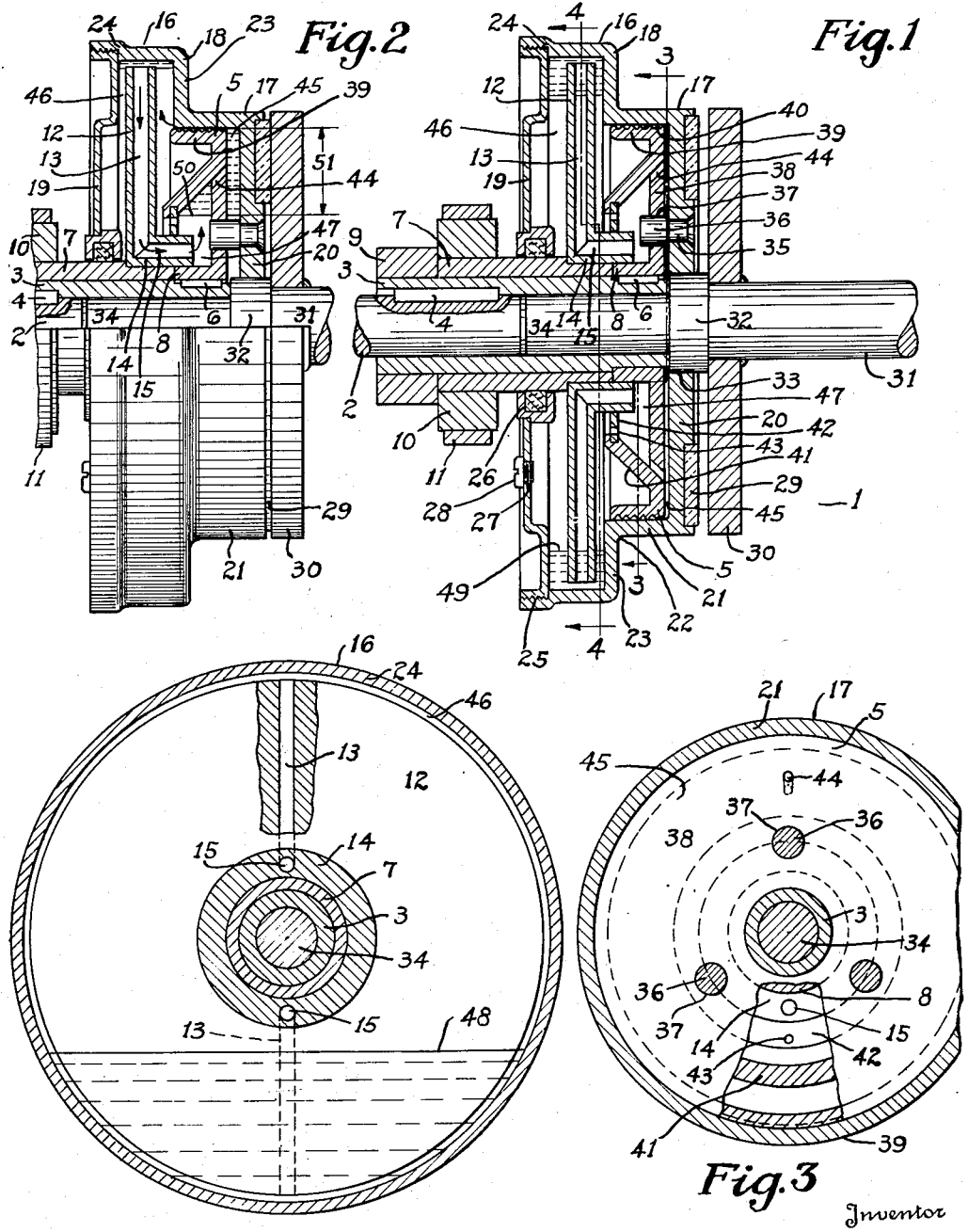
Inventor
Hans J. Zimmermann
By Freasc and Bishop
Attorneys Aug. 8, 1950  H. J. ZIMMERMANN  2,517,955
CENTRIFUGAL MERCURY CLUTCH
Filed Nov. 11, 1944  3 Sheets-Sheet 2
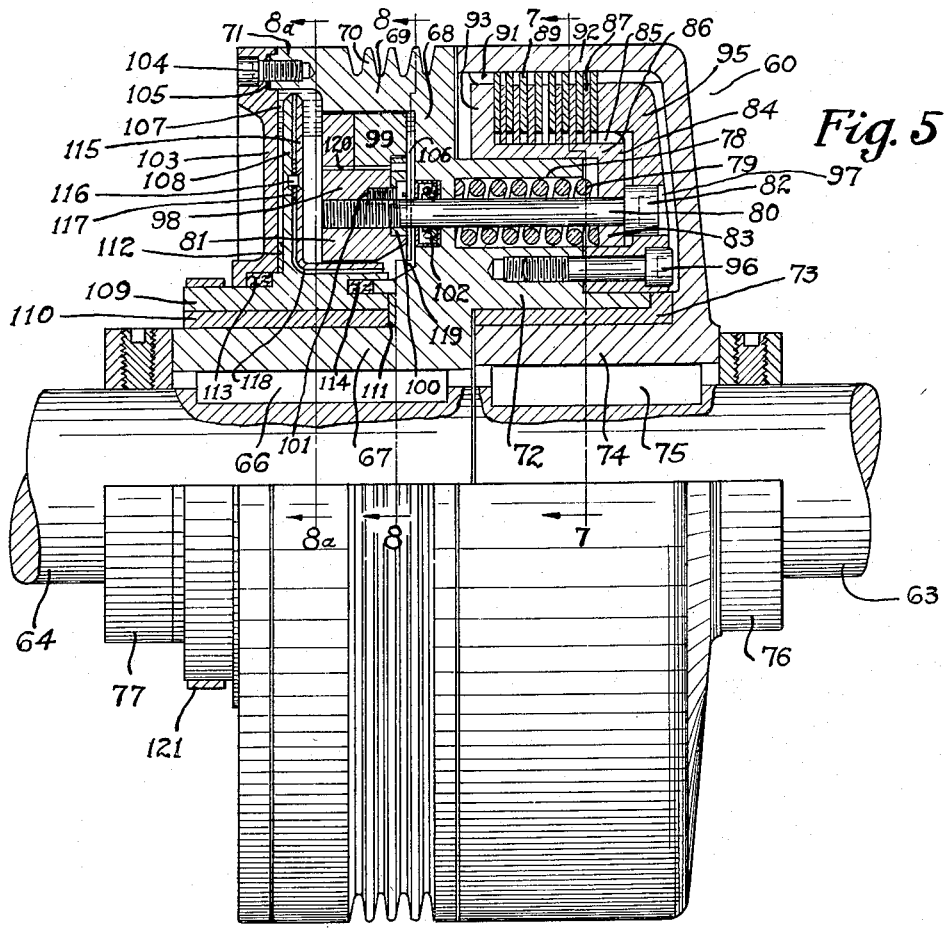
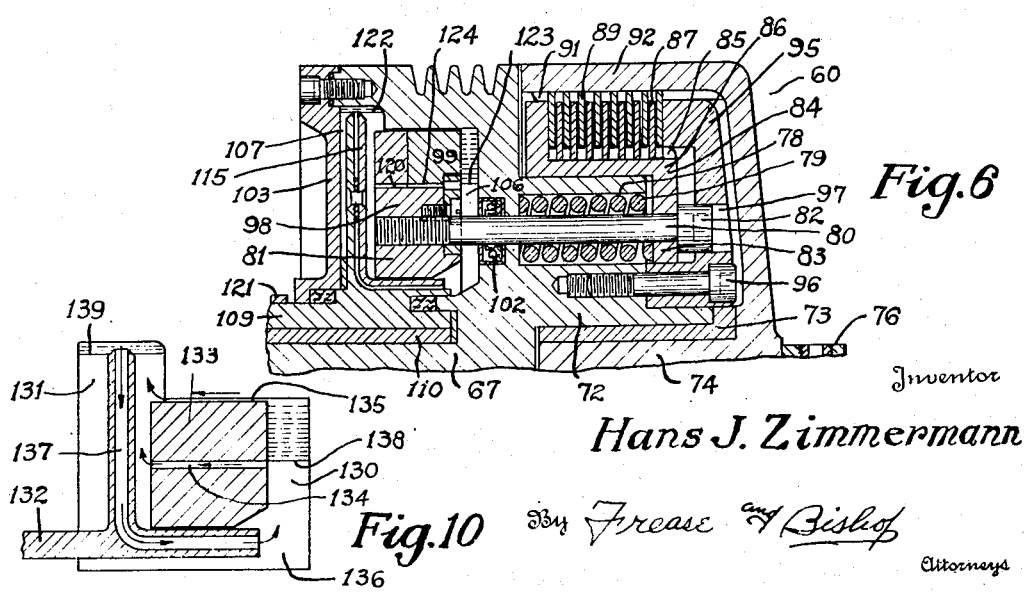
Inventor
Hans J. Zimmermann
By Frease and Bishop
Attorneys Aug. 8, 1950     H. J. ZIMMERMANN     2,517,955
CENTRIFUGAL MERCURY CLUTCH Filed Nov. 11, 1944     3 Sheets-Sheet 3

Inventor
Hans J. Zimmermann
By Frease and Bishop
Attorneys

Patented Aug. 8, 1950

2,517,955

UNITED STATES PATENT OFFICE 2,517,955

CENTRIFUGAL MERCURY CLUTCH

Hans J. Zimmermann, Canton, Ohio, assignor, by mesne assignments, to Automatic Steel Products, Inc., a corporation of Delaware Application November 11, 1944, Serial No. 562,927

19 Claims. (Cl. 192—105)

The invention relates to clutches and more particularly to a liquid, preferably mercury, actuated clutch and to the manual or automatic control of the engagement and disengagement of such a clutch during rotation of the driving or driven members, or both.

Clutches of the liquid type are known in which a rotating body of liquid, preferably mercury, under centrifugal pressure is used for effecting a driving connection between driving and driven members.

In order to engage or disengage such a clutch while the clutch is rotating, or, in other words, to change the relation of the clutch members during rotation of one or more of the members and of the body of liquid under pressure, it is necessary to establish a change in the effectiveness of the liquid pressure, as by rendering it effective or ineffective to actuate the clutch parts. A change in the pressure effectiveness of a body of liquid rotating under pressure may be established by transferring the liquid from a compartment wherein its pressure is effective to actuate certain clutch parts to another compartment wherein its pressure is ineffective to actuate the clutch parts, or vice-versa.

Constructions have been proposed for effecting such transfer, by a scooping device, but difficulties are encountered in operating such a device because the impact of a rotating body of mercury upon a scooping device is exceedingly high and may damage the scooping device operating mechanism.

Another way of effecting the transfer is to provide a valve permitting the escape of mercury from one compartment to another; but it is difficult to provide a satisfactory construction of mechanically operated valves except as shown in my co-pending application Serial No. 523,667, now Patent #2,412,378. However, although valves may be used to transfer mercury under pressure from one rotating compartment to a stationary reservoir or to another rotating compartment of larger diameter wherein the mercury remains under pressure; it is apparently impossible to transfer mercury under pressure from one rotating compartment to another rotating compartment of smaller diameter by means of a valve carried by the rotating members because the pressure due to centrifugal force causes flow of the mercury in the opposite direction, that is from the smaller diameter compartment to the larger diameter compartment.

There are many uses for a clutch that will automatically engage upon attaining a certain speed of rotation and which may be disengaged and reengaged, manually or otherwise, at any speed above said speed of automatic engagement.

There are also many uses for a clutch that is normally engaged at rest and until a certain predetermined speed of rotation is attained whereupon it may be desired to disengage the clutch automatically for all speeds of rotation above the predetermined speed and yet provide for engagement and subsequent disengagement of the clutch at higher speeds when the clutch would normally be disengaged.

Likewise, there are many uses for a clutch that is normally engaged and yet capable of disengagement while rotating and thereafter capable of reengagement.

I have discovered a simplified fluid actuated centrifugal clutch construction that may be operated in any of the described manners, and which avoids the difficulties of and does not use scooping devices or valves.

Fundamentally, the improved clutch construction utilizes a new reverse centrifugal pump principle in which the centrifugally developed pressure of a rotating liquid ring forces or pumps the liquid from a large diameter compartment to a smaller diameter compartment while both are rotating for moving certain clutch parts to either engage or disengage the clutch.

The improved clutch also uses a new principle of a leaking piston combined with a pump and providing a closed circulation system for liquid under centrifugal pressure from one side of the piston, past the piston to a pump chamber, and from the pump chamber back to the one side of the piston whereby establishment or prevention of circulation moves the piston to positions to engage or disengage the clutch.

Accordingly, it is an object of the present invention to provide a liquid actuated centrifugal clutch with means for automatically engaging or disengaging the clutch when a certain predetermined speed of rotation is attained; and with means for subsequently disengaging and engaging the clutch, or vice-versa, at any speed above the predetermined speed of automatic engagement or disengagement.

Furthermore, it is an object of the present invention to provide a liquid actuated centrifugal clutch with centrifugally actuated means for changing the condition of engagement of the clutch while running, from a condition of engagement to a condition of disengagement, or vice-versa, depending upon the initial condition of the clutch.

Furthermore, it is an object of the present invention to provide a new reverse centrifugal pump construction which pumps liquid under pressure from a rotating large diameter compartment to a rotating smaller diameter compartment by the pressure of the liquid due to centrifugal force.

Furthermore, it is an object of the present invention to provide a new liquid actuated centrifugal clutch with a plurality of communicating rotating liquid compartments between which liquid may be circulated, and with means for preventing or establishing circulation therebetween.

Also, it is an object of the present invention to provide a new liquid actuated centrifugal clutch construction having a leaky piston movable from one position to another position to engage or disengage the clutch, and movable from the other position to the one position to disengage or engage the clutch, and with pump means for actuating the piston.

Finally, it is an object of the invention to provide an engaging and disengaging mercury clutch which is extremely simple in construction, durable and effective in operation, relatively inexpensive to manufacture, easy to repair, and which utilizes the foregoing discoveries and principles.

These and other objects and advantages apparent to those skilled in the art from the following description and claims may be obtained, the stated results achieved, and the described difficulties overcome, by the devices, constructions, arrangements, combinations, sub-combinations, parts, elements, discoveries and principles which comprise the present invention, the nature of which is set forth in the following general statement, preferred embodiments of which—illustrative of the best mode in which the applicant has contemplated applying the principle—are set forth in the following description and shown in the drawings, and which are particularly and distinctly pointed out and set forth in the appended claims forming part hereof.

The nature of the improvements in engaging and disengaging clutches of the present invention may be stated in general terms as preferably including in a centrifugal, liquid actuated, preferably mercury, clutch; rotatably mounted walls forming a pressure chamber; a relatively axially movable piston rotatably mounted in said chamber; rotatably mounted walls forming a pump chamber having communication with the pressure chamber; the piston being constructed to permit liquid under pressure in the pressure chamber to escape therefrom between the piston and cylinder walls into the pump chamber; a pump member in said pump chamber adapted to be held stationary or to rotate with the pump chamber walls; passage means in said member leading from the periphery of the pump chamber to a liquid receiving chamber adjacent the axis of the piston; means communicating between said receiving chamber and said pressure chamber; a body of liquid, preferably mercury, in said chambers adapted, when rotated and when the pump member is held stationary, to circulate from the pressure chamber past the piston to the pump chamber and from the pump chamber back to the pressure chamber, and adapted to collect in the pump chamber when rotating and when the pump member rotates therewith, and the pressure of the liquid in the pressure chamber when circulating causing relative movement between the piston and its cylinder; preferably brake means for stopping or permitting rotation of the pump member; driving and driven friction clutch plate means; and means connected between the cylinder, piston and friction clutch plate means whereby relative movement between the piston and its cylinder establishes or relieves driving engagement between the driving and driven friction clutch plate means.

By way of example, preferred embodiments of the improved clutches are illustrated in the accompanying drawings forming part hereof, wherein:

Figure 1 is a vertical section of an engaging clutch incorporating the improvements of the present invention, with the clutch parts in the position that they assume when the clutch is disengaged;

Fig. 2 is a fragmentary view similar to Fig. 1 but illustrating the parts in the position that they assume when the clutch is engaged;

Fig. 3 is a section taken as on the line 3—3, Fig. 1;

Fig. 4 is a section taken on the line 4—4, Fig. 1;

Fig. 5 is a vertical section as on the line 5—5, Fig. 7, of a disengaging clutch incorporating the improvements of the present invention, with the clutch parts in the position that they assume when the clutch is engaged;

Fig. 6 is a fragmentary view similar to a portion of Fig. 5 but illustrating the parts in the position that they assume when the clutch is disengaged;

Fig. 10 is a diagrammatic view illustrating the principles of the improved clutches.

Similar numerals refer to similar parts throughout the drawings.

Figure 7:
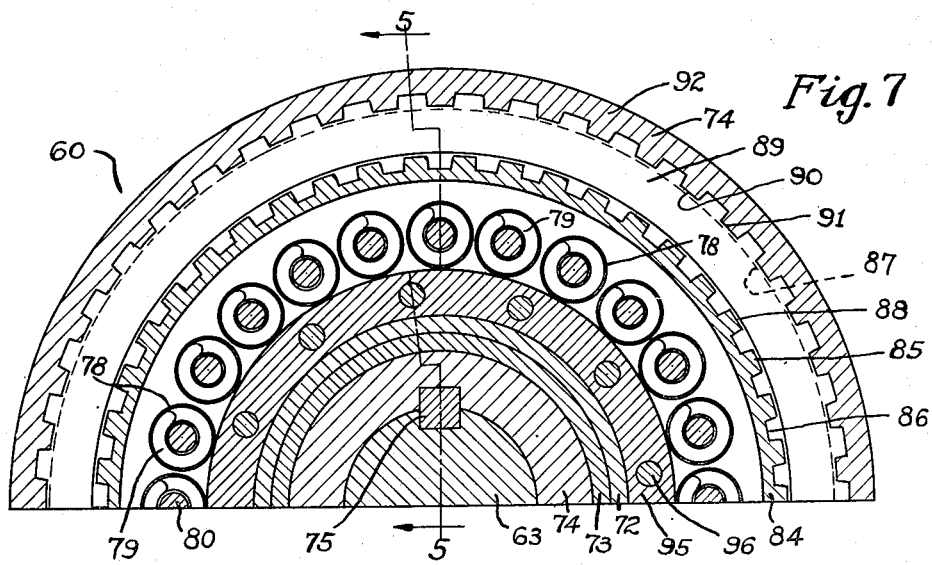
Fig. 7 is a fragmentary sectional view taken as on the line 7—7, Fig. 5.
Figure 8:
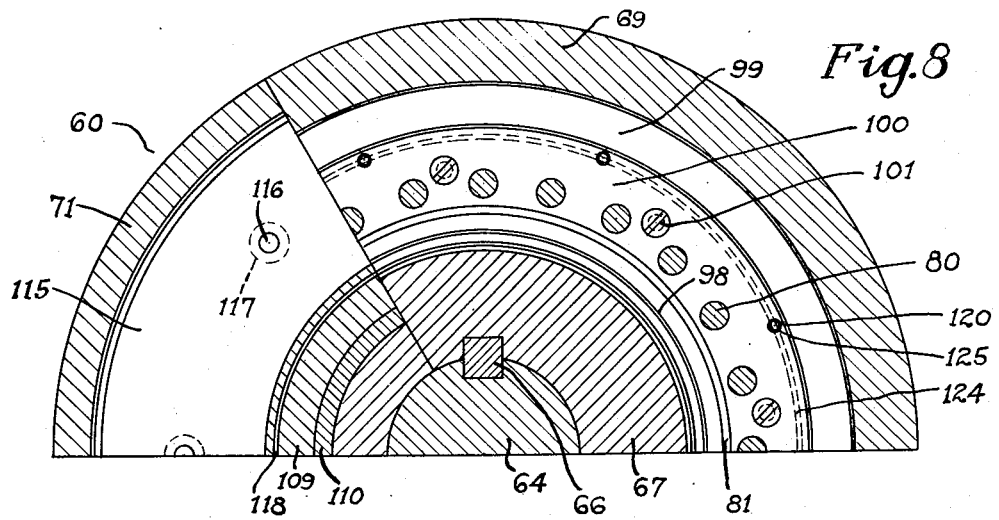
Fig. 8 is a fragmentary sectional view, a portion of which is taken as on the line 8—8, Fig. 5; and another portion of which is taken on the line 8a—8a, Fig. 5.

The discoveries, principles and improvements of the present invention are described first in connection with an engaging clutch 1 shown in Figs. 1 through 4. The clutch 1 includes a driving shaft 2 to which a sleeve 3 is keyed at 4. A piston 5 is keyed at 6 to the inner end of the sleeve 3. An outer sleeve 7 is journaled on the sleeve 3 between the piston hub 8 and collar 9 on the outer end of sleeve 3. The outer end of sleeve 7 is provided with a brake collar or drum 10 with which a brake band or brake shoe 11 may be engaged to stop rotation of the sleeve 7. The brake means 11 may be either manually, hydraulically or electrically operated.

A pump member disc 12 is fixed to the inner end of the sleeve 7 and is provided with radial holes 13 extending from the periphery of the disc 12 to the hub 14 thereof and terminating in communicating holes 15 extending along the hub in a preferably axial direction.

A housing generally indicated at 16 surrounds the piston 5 and pump disc 12, and preferably includes a cylinder member portion 17, a pump chamber member portion 18, and a closure member 19. The cylinder member 17 has a cylinder head 20 and an annular cylinder wall flange 21 connected at 22 to the wall 23 of pump chamber member 18.

The pump chamber member 18 also includes an annular flange wall 24 and the member 19 is threaded at 25 within the outer end of the wall 24. A preferably felt packing seal 26 is mounted on member 19 surrounding the outer sleeve 7 to prevent the escape of liquid from housing 16. A filling opening 27 closed by a screw 28 may also be provided in member 19.

A clutch friction plate 29 is secured to the outer end of the cylinder head 20 and is adapted for frictional clutch engagement with the clutch plate 30 fixed to the driven shaft 31. The driven shaft 31 is preferably enlarged at 32 forming a journal for the central opening 33 of the cylinder head 20, and the driven shaft extension 34 is journaled within the inner sleeve 3.

Pins 35 are preferably secured to the cylinder head 20 having enlarged heads 36 extending through openings 37 in the piston head 38. Thus, rotative movement of the piston 5 is transmitted to the cylinder head 20 and housing 16 by the pins 35—36. However, the housing 16 may move axially with respect to the piston 5.

The skirt 39 of the piston 5 is slidable in the annular cylinder wall 21 and there is sufficient clearance to allow liquid to pass or leak between these members. Preferably, the outer surface of the piston skirt 39 may be formed with a small helical groove 40 to control such leakage. The piston 5 is also preferably provided with a wall 41 carrying a ring 42 at its inner periphery. The ring 42 is provided with a series of holes 43 for a purpose to be later described; and a series of holes 44 extend through the piston head 38.

A clutch pressure chamber or compartment 45 is thus formed within the cylinder member 17 between the cylinder head 20 and piston head 38; a pump chamber 46 is formed within the pump housing member 18 between its side wall 23 and the closure member 19; and a third liquid receiving zone or chamber 47 is formed within the piston 5 between the piston head 38, wall 41 and ring 42.

The holes 43 communicate between the pump chamber 46 and receiving chamber 47; the holes 44 communicate between the pressure chamber 45 and the receiving chamber 47; the clearance and groove 40 permit communication between the pressure chamber 45 and the pump chamber 46; and the holes 13—15 in pump disc member 12 communicate between the outer periphery of the pump chamber 46 and the inner region of the liquid receiving chamber 47.

Liquid for the clutch, preferably mercury, may be introduced into the housing 16 through filling opening 27; and the mercury level is indicated diagrammatically at 48 in Fig. 4 when the clutch is at rest.

The operation of the clutch 1 is as follows: Rotation of driving shaft 2 rotates piston 5 and pins 35—36 carried by housing 16 are engaged by piston 5 and cause housing 16 to rotate with piston 5. The friction between packing seal 26 and sleeve 7 and between the surfaces of pump disc member 12 and the mercury in pump chamber 46 causes the pump member 12 to rotate with housing 16 even though sleeve 7 is loosely journaled on sleeve 3. As housing 16 rotates faster and faster, the mercury is thrown outward by centrifugal force in pump chamber 46 which acts as a reservoir for the mercury when the clutch is disengaged. The mercury assumes the form of an annulus as indicated in Fig. 1 at 49. Any mercury which may have been in receiving chamber 47 or pressure chamber 45 when the clutch was at rest, will leak past piston 5 into pump chamber 46.

When it is desired to engage the clutch, brake means 11 is actuated in any suitable manner, either by hand, or mechanically, or hydraulically, or electrically against brake drum 10 to stop rotation of sleeve 7 and pump disc member 12. When the pump member 12 is held stationary, the pressure of the mercury due to centrifugal force in annular ring 49 in pump chamber 46 forces the mercury to flow inward along passages 13 and 15 of pump member 12 and to discharge into receiving chamber 47. The mercury then flows from receiving chamber 47 outward through holes 44 and into clutch pressure chamber 45 wherein it is again thrown outward by centrifugal force and develops sufficient pressure in said chamber 45 to move the cylinder head 20 away from the piston head 38 and to engage the friction plate 29 with the friction plate 30, thus engaging the clutch. The surfaces of the pump member or impeller 12 may be highly polished or chromium plated in order to reduce frictional resistance between its surfaces and the liquid when the clutch is rotating at high speed and member 12 is held stationary.

The parts are so designed that a much greater volume of liquid can pass through passages 13—15 than can leak past piston 5 so that the reverse centrifugal pump action of stationary disc 12 in rotating pump chamber 46 pumps substantially all of the mercury from the pump chamber 46 into pressure chamber 45 and keeps the pressure chamber substantially filled as indicated at 50 in Fig. 2.

The height of the mercury column in pressure chamber 45, indicated by the numeral 51 in Fig. 2, and the speed of rotation thereof, determine the pressure exerted by the mercury in pressure chamber 45. The height 51 of the mercury column may be controlled by the location of the overflow holes 43 through which excess mercury passes back into the pump chamber 46.

Thus, when mercury is in the pressure chamber 45, and the pressure thereof is forcing cylinder head 20 away from piston head 38, there is a continuous circulation of liquid from the pressure chamber 45 leaking along the piston and into the pump chamber 46 from which it is pumped by centrifugal force back to the pressure chamber 45.

When it is desired to disengage the clutch at any time while rotating, it is only necessary to release the brake 11 which permits sleeve 7 and pump disc element 12 to rotate. Upon rotation of disc element 12, centrifugal force throws any mercury in passages 13—15 outwardly so that pumping of the mercury from pump chamber 46 to the pressure chamber 45 ceases. The mercury in the pressure chamber 45 all leaks past piston 5 into the pump chamber 46 so that pressure in the pressure chamber 45 is eliminated which in turn releases pressure between, and therefore driving engagement between the clutch friction plates 29 and 30.

Thus, in the described operation of clutch 1, the clutch is normally disengaged, and engagement and subsequent disengagement may be effected while the housing 16 is rotating by applying or releasing brake 11. The operation of the brake 11 can be controlled if desired, by a governor (not shown) to apply and release the brake automatically at certain speeds.

The clutch 1 is also adapted for automatic operation by normally applying the brake 11 when the clutch is at rest so that as the driving shaft 2 rotates and comes up to speed, the clutch automatically engages as the liquid pressure in pressure chamber 45 increases due to centrifugal force. When so operated, the clutch may be disengaged and again engaged by releasing and again applying brake 11 during clutch rotation.

The leakage of liquid from pressure chamber 45 to pump chamber 46 past piston 5 has been described as occurring by providing clearance between the skirt 39 of piston 5 and cylinder wall 21, and also by providing the helical groove 40. Such leakage may also be obtained by providing small openings in the piston. The use of a helical groove to control such leakage is much more sensitive than the use of a clearance space. Thus, the clearance space provides for leakage through an orifice; and a relatively small change in the size of the orifice involved may make a large change in the volume of liquid passing therethrough.

The helical groove, however, controls the flow by the friction of the liquid in passing around and around the piston in the groove. A small change in the size of the groove does not materially affect the volume of liquid passed. Accordingly, it is preferable to fit the piston fairly tightly in its cylinder and to control the liquid leakage by the helical groove or labyrinth so as to insure a smaller volume of liquid leakage than is pumped from the pump chamber 46 back to the pressure chamber 45 when the pump member 12 is held stationary.

The discoveries, principles and improvements of the present invention are used in the disengaging clutch construction 60 shown in Figs. 5 through 9. The clutch 60 is identical with the clutch 1 in the manner in which the principles of the invention are utilized; but is modified with respect to the resultant action upon the clutch friction plates of relative movement between the piston and its cylinder resulting from centrifugally developed liquid pressure. Thus, in the clutch 60 such movement causes a disengagement between the driving and driven clutch friction plates which are normally held engaged by spring pressure.

Figure 9:
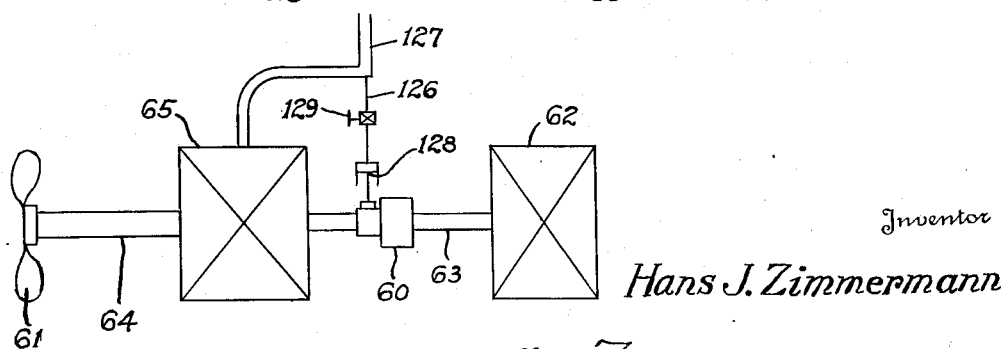
Fig. 9 is a diagrammatic view illustrating an installation of the clutch of Figs. 5 to 8.

Fig. 9 illustrates diagrammatically the application of the clutch 60 to the propeller shaft drive of a warship. Thus, propeller 61 is normally driven by cruising turbine 62 through propeller shaft portion 63, normally engaged clutch 60, and propeller shaft portion 64 which passes through main turbine 65. Cruising turbine 62 normally operates at say 3,000 R. P. M. with low pressure steam, and main turbine 65 may be operated at say up to 6,000 R. P. M. for increased speed with high pressure steam.

When the main turbine 65 is cut in, it is usually desirable to cut out the cruising turbine 62 as by disengaging the clutch 60. It may be desired that clutch 60 be fully automatically disengaged whenever propeller shaft 63—64 attains a speed of rotation above 3,000 R. P. M. and automatically reengaged whenever propeller shaft 64 drops below 3,000 R. P. M.

Alternately, the disengagement or reengagement of the clutch 60 may be actuated in coordination with supplying or cutting off steam pressure to the main turbine 65, which would respectively increase the propeller shaft speed above 3,000 R. P. M. or decrease the same to 3,000 R. P. M.

Under any such conditions of operation and with the main turbine 65 driving propeller shaft 64 and clutch 60 disengaged, it may be desired to engage clutch 60 to permit cruising turbine 62 to act as a booster for main turbine 65.

These conditions or requirements of clutch operation are satisfied by the clutch 60 illustrated in Figs. 5 through 9.

Referring to Fig. 5, normally engaged clutch 60 establishes a driving connection between shaft 63 which acts as a driven shaft and shaft 64 which acts as a driving shaft as referred to clutch operation. Driving shaft 64 is keyed at 66 to clutch cylinder housing member 67 having a cylinder head portion 68, a cylinder wall portion 69, preferably ribbed at 70 for dissipating heat, a pump chamber wall portion 71, and an annular ring-like portion 72 projecting from the cylinder head wall portion 68.

The ring-like portion 72 is journaled on a thrust and sleeve bearing member 73 which in turn is journaled on driven member housing 74 keyed at 75 to driven shaft 63. Collars 76 and 77 may be secured respectively to shafts 63 and 64 to maintain the parts assembled as shown. The shafts 63 and 64 are otherwise journaled in the manner not shown to prevent relative axial movement thereof.

The ring-like portion 72 is provided with a series of circumferentially spaced recesses 78 in which compression springs 79 are located surrounding bolts 80 which pass through cylinder head 68 and are attached to the piston generally indicated at 81. The bolt heads 82 of bolt 80 engage the inturned flange 83 of a ring-like member 84 generally Z-shaped in cross-section having a series of spline teeth 85 on the outer periphery of its generally cylindrical portion 86.

A series of driving member friction clutch plates 87 have their notches 88 engaged with spline teeth 85. An alternate series of driven member friction clutch plates 89 have notches 90 engaged with spline teeth 91 on the interior of the peripheral flange 92 of the driven member housing 74. The outturned flange 93 on ring member 84 is adapted to press plates 89 against plates 87 and against back-up ring 95 bolted at 96 to driving member housing portion 72. The bolt heads 82 are slidable through holes 97 in the back-up member 95.

Thus, springs 79 normally press ring-like member 84 axially away from driving member housing portion 72 and establish frictional driving engagement between clutch plates 87 and 89 so that the clutch 60 is normally engaged and driving shaft 64 and driven shaft 63 are connected.

The piston 81 preferably comprises a ring 98 somewhat L-shaped in cross-section to which a carbon ring 99 (which does not require lubrication) is clamped by assembly ring 100 and bolts 101. A seal 102 is provided around each bolt 80 in the cylinder head 68 to prevent the escape of liquid along the bolts 80. A closure member 103 is bolted at 104 with an intervening gasket 105 to the pump chamber wall portion 71 of housing 67.

A pressure chamber 106 is thus formed between the cylinder head portion 68 and piston 81; and a pump chamber 107 is formed by the housing portion 71, cover plate 103, and piston 81. A pump member is located within the pump chamber 107, preferably formed in part by a disc 108 projecting radially of a hub 109 rotatable on bearing 110 mounted on housing member 67. Thrust washers 111 and 112 are provided to axially locate the hub 109 and preferably felt seals 113 and 114 are provided to prevent leakage of mercury from the chambers 106 and 107.

An L-shaped disc 115 is riveted at 116 to disc 108, spacer washers 117 being interposed between discs 108 and 115 to provide a passage-way 118 leading from the outer periphery of the pump chamber 107 to the liquid receiving chamber 119 which communicates with the pressure chamber 106. Overflow holes 120 are provided through piston member 98 to control the height of the mercury column in the pressure chamber 106 as shown in Fig. 6. A brake band 121 may be engaged around hub 109 of pump member 108 for stopping rotation of the pump member to pump mercury from the pump chamber 107 to pressure chamber 106.

The carbon ring portion 99 has sufficient clearance within cylinder wall 69 to permit mercury to escape slowly from pressure chamber 106 to pump chamber 107; or a helical groove or labyrinth may be provided as in clutch 1. The mercury circulation operates in the same way in clutch 60 as described in connection with clutch 1. Thus, in operation of clutch 60, when pump element 108 is held stationary by brake band 121 while the clutch is rotated, the pressure of the mercury ring 122 in pump chamber 107 forces the mercury inward through the passage 118 between members 108 and 115 to the liquid receiving chamber 119 from which it is thrown outward by centrifugal force into pressure chamber 106 forming a pressure column 123 as illustrated in Fig. 6.

The pressure of the mercury column in annular ring 123 is sufficient to cause relative movement between the piston 81 and its cylinder member 67. The mercury leaks past piston 81 at the slight clearance between the outer periphery of the piston and the cylinder wall 69 back to the pump chamber 107.

Again, the parts are so designed that a much greater volume of liquid is pumped through passage-way 118 than can leak past piston 81 so that the reverse centrifugal pump action of stationary pump element 108 in rotating pump chamber 107 is to substantially drain the mercury from the pump chamber 107 and introduce it into the pressure chamber 106, keeping the pressure chamber 106 substantially filled.

The height of the mercury column 123 in pressure chamber 106 is controlled by the location of the overflow holes 120, which communicate with the clearance space 124 between carbon ring 99 of piston 81 and piston member 98. Communication between clearance space 124 and pressure chamber 106 may be established by providing holes 125 in the periphery of assembly ring 100 opposite holes 120.

When brake 121 is released, the pump element 108 may rotate with the other clutch parts so that pumping and circulation of the mercury ceases and the mercury level in pressure chamber 106 and pump chamber 107 becomes the same as shown in Fig. 5. Thus, the mercury pressure on both sides of piston 81 is the same so that there is no pressure on piston 81 effective to cause relative movement of the same with respect to its cylinder.

The clutch 60 is adapted for automatic operation. Since the clutch is normally engaged by springs 79, cruising turbine 62 drives propeller 61 through shaft 63, clutch 60 and shaft 64. The cruising turbine 62 may have a top speed of 3,000 R. P. M. and the springs 79 are so designed as to hold the clutch engaged up to a speed of 3,000 R. P. M. Meanwhile, brake 121 is normally engaged and the mercury circulates between the pump and pressure chambers; but the pressure thereof in pressure chamber 106 is not sufficient to overcome the pressure of springs 79.

However, when the main turbine 65 is cut in, the speed of clutch 60 is increased beyond 3,000 R. P. M. whereupon the pressure of the mercury in pressure chamber 106 increases and becomes sufficient to overcome the pressure of springs 79, and piston 81 moves to the position shown in Fig. 6, compressing springs 79 and removing engaging pressure between friction plates 87 and 89, thus disengaging the clutch automatically. At any time when it is desired to engage or subsequently disengage the clutch while the main turbine 65 is rotating at a speed above 3,000 R. P. M., it is only necessary to release or re-apply brake 121. As long as brake 121 is applied, clutch 60 will automatically reengage whenever the speed of shaft 64 (which is not the clutch driving shaft) is reduced below 3,000 R. P. M.

Alternately, the operation of clutch 60 may be controlled by providing spring 79 of sufficient strength to keep the clutch engaged when the cruising turbine 62 is operated so as to establish driving engagement between shafts 63 and 64. The brake 121, however, is normally released. When main turbine 65 is cut in, a steam connection 126 from steam line 127 for main turbine 65 may be used to operate a piston in cylinder 128 to apply brake 121 as illustrated in Fig. 9. When brake 121 is applied, piston 81 operates to disengage clutch 60 and the clutch well remain disengaged as long as steam is supplied to the main turbine 65. If for some reason it is desired to engage clutch 60 after it is thus disengaged, it is only necessary to operate a relief valve 129 in line 126 so as to release brake 121, thereby permitting the clutch parts to assume the position shown in Fig. 5 wherein the clutch is engaged.

The principles of operation of the improved clutch are illustrated diagrammatically in Fig. 10 wherein the pressure chamber is indicated at 130, the pump chamber at 131, the pump member at 132, the piston at 133, the overflow opening through the piston at 134, the clearance between the piston and its cylinder wall at 135, the liquid receiving chamber at 136 and the passage through the pump member at 137. The mercury level when circulating in the pressure chamber 130 is indicated at 138 and in the pump chamber 131 at 139.

When chambers 130 and 131, and piston 133 are rotating, the liquid in the chambers is thrown outward by centrifugal force and collects in an annular ring in the peripheries of the chambers. Any mercury in chamber 130 escapes through clearance 135 into pump chamber 131, which has the largest diameter. The liquid collects and remains in pump chamber 131 as long as pump element 132 rotates therewith. When pump element 132 is held stationary, the centrifugally developed pressure of the rotating liquid ring 139 in pump chamber 131 forces or pumps the liquid from the large diameter chamber 131 to the smaller diameter 130 through passage-way 137 of pump element 132. Such action is referred to herein as a "reverse centrifugal pump action."

In a centrifugal pump, the housing is normally stationary and a rotor therein pumps liquid outward to the periphery of the housing and outward of the housing. However, in the reverse centrifugal pump utilized in accordance with the present invention, the housing rotates and when the pump is pumping, the pump member within the housing is held stationary, whereby liquid under pressure may be pumped from the periphery of the housing to another chamber of smaller diameter rotating with the housing.

As the liquid is continuously pumped from pump chamber 131 through passage 137 into pressure chamber 130, the annular liquid pressure ring 138 is established and the circulation of liquid continues as shown by the arrows in Fig. 10. The height of the liquid column may be controlled by the location of overflow openings 134 which permit liquid to escape therethrough directly back to pump chamber 131.

The pressure of the annular liquid ring column 138 results in relative movement of the piston 133 with respect to its cylinder and this relative movement may be connected mechanically to either engage or disengage a friction drive between friction clutch plates carried by the clutch driving and driven members.

Thus, a further principle is used in the improved clutch wherein a leaking piston is combined with a pump to provide a closed circulation system. The circulation induced by centrifugally developed pressure of the rotating change the relative position of the piston with respect to its cylinder; and the relative change is used to engage or disengage the clutch.

The clutch construction of the present invention is very simple. The component parts do not have a complicated design involving difficult machining operations. The operation of the clutch to engage or disengage the same is accomplished by applying or releasing a brake and avoids the use of scooping devices or valves, which may be difficult to adjust and operate. Only a relatively small amount of mercury is necessary for operating the clutch, yet extreme forces may be developed for actuating the clutch parts.

Accordingly, the present invention provides an improved liquid actuated centrifugal clutch construction which may be automatically engaged or disengaged when a certain speed of rotation is attained and thereafter disengaged and engaged, or vice-versa; or which may be engaged or disengaged at any time at the election of the operator; which overcomes the disadvantages and difficulties of prior art clutches; which utilizes centrifugal force for controlling the actuation of the clutch parts; which utilizes a new reverse centrifugal pump arrangement; which utilizes a leaking piston and pump for circulating liquid to control operation of the piston; and which is simple in construction, durable, effective and reliable in operation, and relatively inexpensive to manufacture.

The embodiments of the present improvements illustrated and described herein are by way of example and the scope of the present invention is not limited to the exact details of construction of the various parts.

For instance, the liquid used is preferably mercury because of the many advantages accruing by use of this particular liquid which has a very high specific gravity, is stable under normal operating conditions, and is unaffected by and does not affect the working parts which it contacts. However, other high specific gravity liquids may be used in accordance with the principles and discoveries of the present invention without affecting their operation.

Moreover, a brake has been illustrated and described for controlling the rotation of the pump member; but other means may be used for this purpose. Irrespective of the means used, the same may be operated manually, mechanically, hydraulically, or electrically in any desired manner.

Finally, in the foregoing description, certain terms have been used for brevity, clearness and understanding; but no unnecessary limitations are to be implied therefrom beyond the requirements of the prior art, because such words are utilized for descriptive purposes herein and not for the purpose of limitation, and are intended to be broadly construed.

Having now described the features, principles and discoveries of the invention, the construction, operation and use of preferred embodiments thereof, and the advantageous, new and useful results attained by the improved construction the new and useful devices, constructions, elements, combinations, sub-combinations, parts and elements, and reasonable mechanical equivalents thereof obvious to those skilled in the art, are set forth in the appended claims.

I claim:

1. In a liquid actuated centrifugal clutch between driving and driven members, walls forming a pressure chamber, walls forming a pump chamber, means for rotating said walls, actuating liquid thrown centrifugally outwardly in said chambers when rotated, clutch friction drive element actuating means operatively associated with the liquid under pressure in the pressure chamber, means for passing liquid by its pressure from the pressure chamber to the pump chamber, and means for passing liquid by its pressure at a faster rate from the pump chamber to the pressure chamber to maintain a body of liquid in the pressure chamber under pressure to actuate the clutch friction drive element actuating means.

2. In a liquid actuated centrifugal clutch between driving and driven members, walls forming a pressure chamber, walls forming a pump chamber, means for rotating said walls, actuating liquid in said chambers, means operatively associated with the liquid under pressure in the pressure chamber and with clutch friction drive elements for controlling driving engagement of said elements, means for maintaining a body of liquid in said pressure chamber to automatically operate the clutch control means by the pressure of the liquid developed by centrifugal force upon the attainment of a predetermined speed of rotation, means for draining liquid from the pressure chamber to the pump chamber, and pump means for reintroducing it into the pressure chamber while the walls of both chambers are rotating at a speed above said predetermined speed.

3. In a liquid actuated centrifugal clutch between driving and driven members, cylinder walls forming a pressure chamber, a relatively axially movable piston mounted in said pressure chamber, walls forming a pump chamber, means for rotating said piston and walls, actuating liquid in said chambers, the piston being constructed to permit liquid under pressure in the pressure chamber to escape therefrom between the piston and cylinder walls into the pump chamber, a pump member in said pump chamber having passage means communicating between said chambers, the rotating liquid circulating between the chambers when the pump member is held stationary and collecting in the pump chamber when the pump member is rotating, the pressure of the liquid in the pressure chamber when circulating causing relative movement between the piston and its cylinder, and means for selectively stopping or permitting rotation of the pump member.

4. In a liquid actuated centrifugal clutch between driving and driven members, cylinder walls forming a pressure chamber, a relatively axially movable piston mounted in said pressure chamber, walls forming a pump chamber, means for rotating said piston and walls, actuating liquid in said chambers, the piston being constructed to permit liquid under pressure in the pressure chamber to escape therefrom between the piston and cylinder walls into the pump chamber, a pump member in said pump chamber having passage means communicating between said chambers, the rotating liquid circulating between the chambers when the pump member is held stationary and collecting in the pump chamber when the pump member is rotating, the pressure of the liquid in the pressure chamber when circulating causing relative movement between the piston and its cylinder, means for selectively stopping or permitting rotation of the pump member; driving and driven friction clutch elements; and means connected between the cylinder, piston and elements whereby relative movement between the piston and its cylinder establishes or relieves driving engagement between the clutch friction drive elements.

5. In a liquid actuated centrifugal clutch between driving and driven members, cylinder walls forming a pressure chamber, a relatively axially movable piston mounted in said pressure chamber, walls forming a pump chamber, means for rotating said piston and walls, actuating liquid in said chambers, the piston being constructed to permit liquid under pressure in the pressure chamber to escape therefrom between the piston and cylinder walls into the pump chamber, a pump member in said pump chamber having passage means communicating between said chambers, the rotating liquid circulating between the chambers when the pump member is held stationary and collecting in the pump chamber when the pump member is rotating, the pressure of the liquid in the pressure chamber when circulating causing relative movement between the piston and its cylinder, means for selectively stopping or permitting rotation of the pump member, and means for maintaining a constant liquid level in said pressure chamber when the liquid is circulated.

6. In a liquid actuated centrifugal clutch, a driving shaft, a driven shaft, a housing mounted for rotation with the driving shaft, said housing being formed with a pressure chamber and a pump chamber, a piston mounted for rotation with said driving shaft within the housing and located between said chambers, said housing and piston being mounted for relative movement axially of the driving shaft, the piston being constructed to permit liquid under pressure in the pressure chamber to escape therefrom between the piston and housing walls into the pump chamber, pump means in said pump chamber journalled on one of said shafts comprising a disc-like member having passage means communicating between said chambers, actuating liquid in said chambers, means for selectively stopping or permitting rotation of the disc-like member, friction element means mounted for rotation with the housing, friction element means mounted for rotation with the driven shaft, and means connected between the housing, piston and friction element means whereby relative movement between the piston and housing establishes or relieves driving engagement between said friction element means.

7. In a liquid actuated centrifugal clutch, a driving shaft, a driven shaft, a housing mounted for rotation with the driving shaft, said housing being formed with a pressure chamber and a pump chamber, a piston mounted for rotation with said driving shaft within the housing and located between said chambers, said housing and piston being mounted for relative movement axially of the driving shaft, the piston being constructed to permit liquid under pressure in the pressure chamber to escape therefrom between the piston and housing walls into the pump chamber, pump means in said pump chamber journalled on one of said shafts comprising a disc-like member having passage means communicating between said chambers, actuating liquid in said chambers, means for selectively stopping or permitting rotation of the disc-like member, means for maintaining a constant liquid level in said pressure chamber when rotation of the disc-like member is stopped, friction element means mounted for rotation with the housing, friction element means mounted for rotation with the driven shaft, and means connected between the housing, piston and friction element means whereby relative movement between the piston and housing establishes or relieves driving engagement between said friction element means.

8. In a normally disengaged liquid actuated centrifugal clutch, a driving shaft, a driven shaft, a housing mounted for rotation with and movable axially of the driving shaft, said housing being formed with a pressure chamber and a pump chamber, a piston fixed on said driving shaft for rotation therewith within the housing and located between said chambers, the piston being constructed to permit liquid under pressure in the pressure chamber to escape therefrom between the piston and housing walls into the pump chamber, a disc-like pump member in said pump chamber journalled on said driving shaft and provided with radially and axially extending passage means communicating between the periphery of the pump chamber and a zone substantially radially inward of the pressure chamber, a body of mercury in said chambers, passage means through said piston communicating between said chambers for maintaining a constant liquid level in the pressure chamber when mercury is present under pressure in said pressure chamber, means for selectively holding said disc member stationary or for permitting it to rotate with the housing, friction element means mounted on the housing, friction element means mounted on the driven shaft and engageable with said housing friction element means, and the pressure of mercury thrown centrifugally outwardly in the pressure chamber when the disc member is held stationary and the driving shaft rotated moving the housing axially to establish driving engagement between said friction elements.

9. In a normally engaged liquid actuated centrifugal clutch, a driving shaft, a driven shaft, a housing fixed on the driving shaft for rotation therewith, said housing being formed with a pressure chamber and a pump chamber, a piston mounted for rotation with and movable axially of the driving shaft within the housing and located between said chambers, the piston being constructed to permit liquid under pressure in the pressure chamber to escape therefrom between the piston and housing walls into the pump chamber, a disc-like pump member in said pump chamber journalled on said driving shaft and provided with radially and axially extending passage means communicating between the periphery of the pump chamber and a zone substantially radially inward of the pressure chamber, a body of mercury in said chambers, passage means through said piston communicating between said chambers for maintaining a constant liquid level in the pressure chamber when mercury is present under pressure in said pressure chamber, means for selectively holding said disc member stationary or for permitting it to rotate with the housing, friction element means mounted on the housing, friction element means mounted on the driven shaft and engageable with said housing friction element means, spring means normally reacting to establish driving engagement between said friction elements, and the pressure of mercury thrown centrifugally outwardly in the pressure chamber when the disc member is held stationary and the driving shaft rotated moving the piston axially to overcome the action of said spring means and to relieve driving engagement between said friction elements.

10. A liquid actuated centrifugal clutch between driving and driven members including walls forming a pressure chamber, walls forming a pump chamber, passage means communicating from the pressure chamber to the pump chamber, means for rotating said walls, actuating liquid in said chambers, the pressure chamber walls including actuator means rotated by the driving member and movable by liquid pressure in the pressure chamber to change the degree of clutch engagement, pump means having communication from the pump chamber to the pressure chamber for pumping said liquid when rotating from the pump chamber to the pressure chamber, and means for selectively establishing or preventing operation of the pump means.

11. A liquid actuated centrifugal clutch between driving and driven members including walls forming an annular pressure chamber, walls forming an annular pump chamber having a larger diameter than the diameter of the pressure chamber, means for rotating said walls, actuating liquid in said chambers, the pressure chamber walls including actuator means rotated by the driving member and movable by liquid pressure in the pressure chamber to change the degree of clutch engagement, pump means for pumping said liquid when rotating from the pump chamber to the pressure chamber, passage means for conducting said liquid back to the pump chamber, and means for selectively establishing or preventing operation of the pump means.

12. A liquid actuated centrifugal clutch between driving and driven members including walls forming a pressure chamber, walls forming a pump chamber, passage means communicating from the pressure chamber to the pump chamber, means for rotating said walls, actuating liquid in said chambers, the pressure chamber walls including actuator means rotated by the driving member and movable by liquid pressure in the pressure chamber to change the degree of clutch engagement, pump means having communication from the pump chamber to the pressure chamber for pumping said liquid when rotating from the pump chamber to the pressure chamber, means for maintaining a body of liquid in the pressure chamber when the liquid is circulated, and means for selectively establishing or preventing operation of the pump means.

13. A liquid actuated centrifugal clutch between driving and driven members including walls forming a pressure chamber, walls forming a pump chamber, passage means communicating from the pressure chamber to the pump chamber, means for rotating said walls, actuating liquid thrown centrifugally outwardly in said chambers when rotated, the pressure chamber walls including actuator means rotated by the driving member and movable by liquid pressure in the pressure chamber to change the degree of clutch engagement, pump means operated by the pressure of the rotating liquid and having communication from the pump chamber to the pressure chamber for pumping the liquid from the pump chamber to the pressure chamber, and means for selectively establishing or preventing operation of the pump means.

14. A liquid actuated centrifugal clutch between driving and driven members including relatively movable piston and cylinder members forming a pressure chamber therebetween, one of said piston and cylinder members being movable by liquid pressure in the pressure chamber to change the degree of clutch engagement, walls forming a pump chamber, means for rotating the piston and cylinder members and said walls, actuating liquid in said chambers, pump means operable during rotation of said members and walls and liquid in said chambers for pumping said liquid from the pump chamber to the pressure chamber, the piston and cylinder members being constructed to permit liquid under pressure to escape therebetween from the pressure chamber to the pump chamber, and means for selectively establishing or preventing operation of the pump means.

15. A liquid actuated centrifugal clutch between driving and driven members including walls forming a pressure chamber, walls forming a pump chamber, means for rotating said walls, actuating liquid thrown centrifugally outwardly in said chambers when rotated, the pressure chamber walls including actuator means rotated by the driving member and movable by liquid pressure in the pressure chamber to change the degree of clutch engagement, a pump member in said pump chamber having passage means communicating between said chambers, passage means communicating from the pressure chamber to the pump chamber, and means for holding said pump member stationary to pump rotating liquid by its pressure from said pump chamber through said pump passage means to said pressure chamber.

16. A liquid actuated centrifugal clutch between driving and driven members including walls forming a pressure chamber, walls forming a pump chamber, passage means communicating from the pressure chamber to the pump chamber, means for rotating said walls, actuating liquid in said chambers, pump means having communication from the pump chamber to the pressure chamber for pumping said liquid when rotating from the pump chamber to the pressure chamber, clutch friction elements connected respectively with the clutch driving and driven members, means actuated by the pressure of liquid in said pressure chamber to change the degree of frictional engagement of said clutch elements, and means for selectively establishing or preventing operation of the pump means to establish or prevent liquid pressure in said pressure chamber.

17. A liquid actuated centrifugal clutch between driving and driven members including walls forming a pressure chamber, walls forming a pump chamber, means for rotating said walls, actuating liquid thrown centrifugally outwardly in said chambers when rotated, means for passing liquid by its pressure from the pressure chamber to the pump chamber, means for passing liquid by its pressure from the pump chamber to the pressure chamber, clutch friction elements connected respectively with the clutch driving and driven members, means actuated by the pressure of liquid in said pressure chamber controlling frictional engagement between said elements, and means operable while the walls of the pump chamber are rotating for rendering the pressure of liquid in said pump chamber ineffective to actuate said last mentioned means.

18. A liquid actuated centrifugal clutch between driving and driven members including walls forming a pressure chamber, means for rotating said walls, walls forming a liquid reservoir chamber, passage means communicating from the pressure chamber to the reservoir chamber, actuating liquid in said chambers, the pressure chamber walls including actuator means rotated by the driving member and movable by liquid pressure in the pressure chamber to change the degree of clutch engagement, pump means having communication from the reservoir chamber to the pressure chamber for pumping said liquid from the reservoir to the pressure chamber when the pressure chamber walls are rotating, and means for selectively establishing or preventing operation of the pump means.

19. In a liquid actuated centrifugal clutch between driving and driven members, walls forming two communicating rotating liquid containing chambers, actuating liquid thrown centrifugally outwardly in said chambers when rotated, clutch friction drive element actuating means, the pressure of liquid when liquid is present in one of said chambers operating said actuating means, the pressure of the liquid when located in the other chamber being ineffective to operate said actuating means, and pump means for pumping liquid from said other chamber to said one chamber while the walls of both chambers are rotating, and means for controlling said pump means selectively to establish or prevent liquid pressure in said one chamber.

HANS J. ZIMMERMANN.

REFERENCES CITED

The following references are of record in the file of this patent:

UNITED STATES PATENTS

| Number | Name | Date |
| --- | --- | --- |
| 185,691 | Napier | Dec. 26, 1876 |
| 1,618,643 | Dickson | Feb. 22, 1927 |
| 1,858,514 | Lell | May 17, 1932 |
| 1,859,607 | Sinclair | May 24, 1932 |
| 2,055,300 | Maurer | Sept. 22, 1936 |